United States Patent [19]

Greer

[11] 4,116,209

[45] Sep. 26, 1978

[54] SHOCK ACTUATED SHUT-OFF VALVE

[76] Inventor: Charles W. Greer, 303 N. Swall Dr., Beverly Hills, Calif. 90210

[21] Appl. No.: 794,264

[22] Filed: May 5, 1977

[51] Int. Cl.² ............................................. F16K 17/36
[52] U.S. Cl. ...................................................... 137/38
[58] Field of Search ................................... 137/38, 39

[56] References Cited

U.S. PATENT DOCUMENTS

| 2,585,316 | 2/1952 | Hobson | 137/38 |
| 3,396,739 | 8/1968 | Rosell | 137/39 |

Primary Examiner—Robert G. Nilson
Attorney, Agent, or Firm—Donald Diamond

[57] ABSTRACT

A shock actuated shut-off valve for fluid flow lines is provided which includes a valve housing having a central chamber in communication with (a) a hollow inlet conduit, (b) a hollow outlet conduit and (c) a hollow, outwardly enclosed stowage arm in upward, substantially plumb communication with the central chamber. A valve element is disposed in the stowage arm in spaced relationship to the inner wall thereof and is releasably supported therein by a support member secured to the inner wall. Vibratory force effects displacement of the valve element from the support member and transition of the same into the central chamber where the valve element sealingly engages the chamber to interrupt the fluid flow passage from the inlet conduit to the outlet conduit.

18 Claims, 7 Drawing Figures

U.S. Patent
Sept. 26, 1978
4,116,209
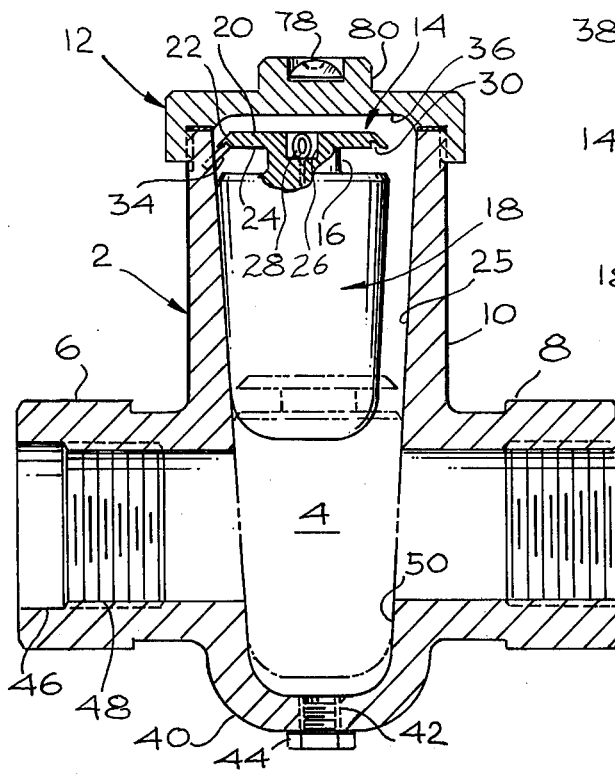
Fig. 1
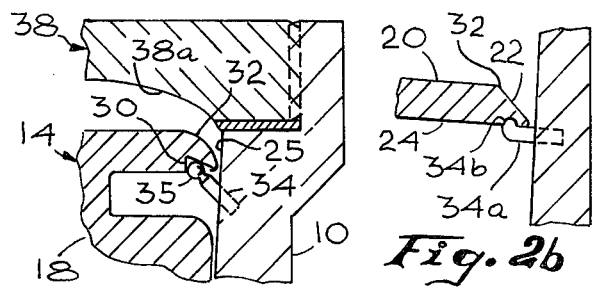
Fig. 2a
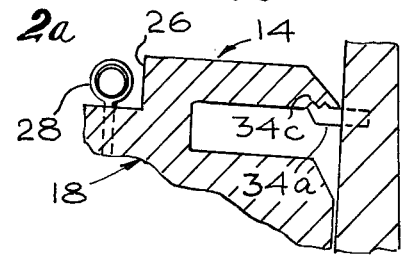
Fig. 2b
Fig. 2c
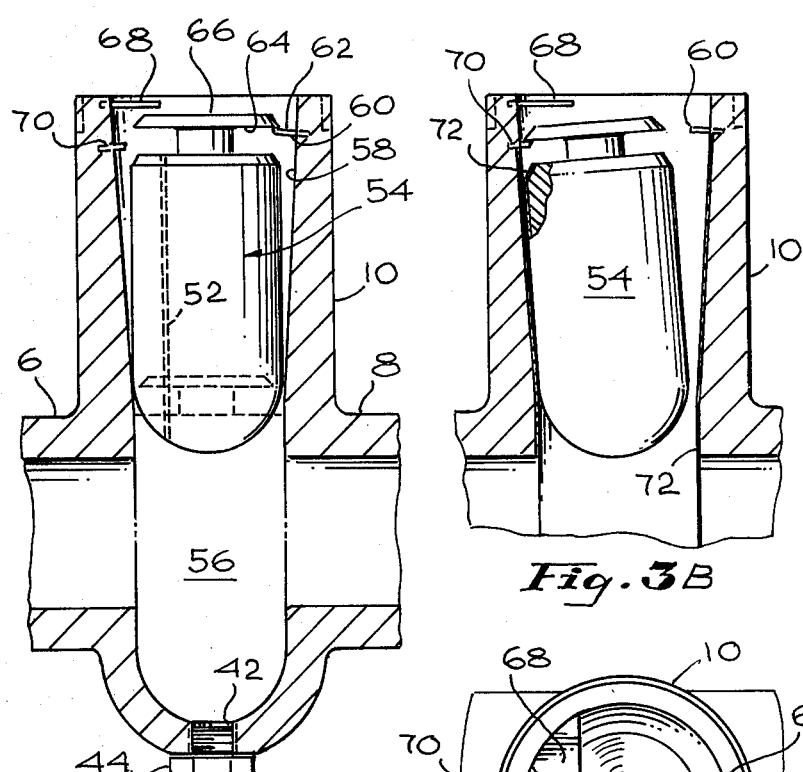
Fig. 3A
Fig. 3B
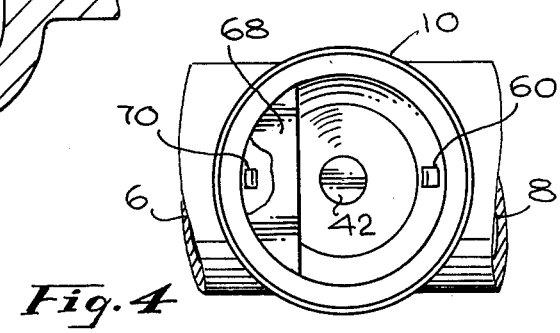
Fig. 4
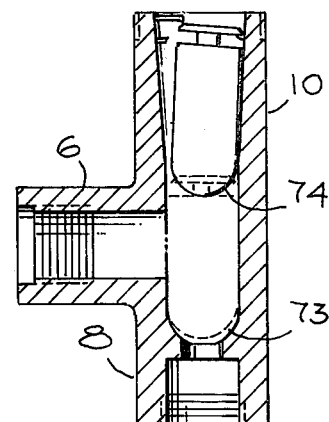
Fig. 6
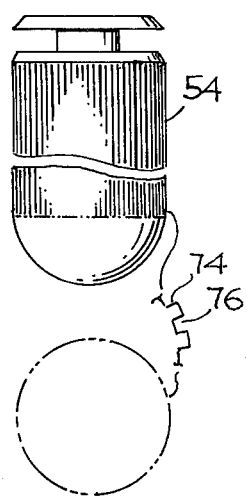
Fig. 5

SHOCK ACTUATED SHUT-OFF VALVE

BACKGROUND OF THE INVENTION

This invention relates to shut-off valves for fluid flow conduits and, more particularly, to shock actuated, shut-off valves for such conduits. Although the shut-off valves described herein are particularly well adapted for closing natural gas lines in response to vibratory forces arising from seismic disturbances, their use is not so limited and they may be used to interrupt flow in lines carrying different kinds of gases and fluids under wide ranges of temperature and pressure in response to shock actuation from diverse sources.

In an earthquake or seismic disturbance of any significant magnitude, substantial vibratory forces are generated which can damage and rupture feeder lines used to deliver natural gas into residential, commercial and public structures. As a result, natural gas can leak or flow from such damaged or ruptured lines and accumulate in and about the aforesaid structures. The accumulated natural gas can form an explosive mixture with the surrounding air and be detonated by an appliance pilot light, other fire source or a spark. The fire and explosion hazard from damaged or broken gas lines following an earthquake is well known and constitutes a significant threat to persons and property.

A number of shock actuated, gas shut-off valves have been disclosed in the prior art to meet the fire and explosion hazard posed by earthquake damage to gas feeder lines. These prior art disclosures include U.S. Pat. No. 2,585,316 (Hobson, 1952); U.S. Pat. No. 2,927,592 (Ferre, 1960); U.S. Pat. No. 3,747,616 (Lloyd, 1973); and U.S. Pat. No. 3,768,497 (Mueller, 1973).

PRIOR ART

U.S. Pat. No. 2,585,316 discloses a shock operated fluid valve comprising a housing having a central chamber in communication with an inlet conduit, an outlet conduit and a horizontally disposed, valve element stowage arm provided with closure means at its outer end. The floor of the stowage arm is concave adjacent to the central chamber and thereafter slopes downwardly while the side walls and top wall of the stowage arm have a parabolic configuration. An adjusting screw traverses the closure of the stowage arm for defining the stowage position of the valve element. A removable plug, which is disposed within an aperture in the upper portion of the housing, is provided with a chain which is attached to the valve element for facilitating resetting of the valve element following dislodgement from the stowage arm. The valve element, upon displacement from the stowage arm, falls through the central chamber to sealingly engage a valve seat which is disposed upwardly adjacent to the vertically positioned inlet conduit.

U.S. Pat. No. 2,927,592 discloses a shock actuated valve comprising a housing having a central chamber in communication with vertically aligned inlet and outlet conduits. The bottom wall of the central chamber slopes downwardly and merges with a horizontal section which defines a valve seat at the confluence of the inlet conduit with the central chamber. A valve element support bracket, having a pocket in its upper surface and an adjusting screw upwardly directed from its lower surface, is attached to a side wall of the central chamber. A spherical valve element is supported within the pocket of the bracket until displaced by vibratory forces at which time it falls through the central chamber to sealingly engage the valve seat.

SUMMARY OF THE INVENTION

In accordance with this invention, and in contrast to the valve devices of the prior art, there is provided a shock actuated shut-off valve for fluid flow lines which comprises a valve housing having a central chamber in communication with (a) a hollow inlet conduit, (b) a hollow outlet conduit and (c) a hollow stowage arm is upward, substantially plumb communication with the central chamber, with the stowage arm being provided with closure means at its outer end.

A valve element, which includes a valve head and a valve body interconnected by a valve neck, is disposed in the stowage arm, with the valve head being distal to the central chamber. The valve head of the valve element is in engagement with and releasably supported by support means secured to the inner wall of the stowage arm.

The valve element is in spaced relationship to the inner wall of the stowage arm to provide valve element clearance between the support means and the inner wall whereby lateral dislodgement of the valve head from the support means effects transition of the valve element through the stowage arm into the central chamber with the valve body sealingly engaging the chamber with respect to at least one of the inlet and outlet conduits.

DESCRIPTION OF THE DRAWINGS

FIG. 1 is a section view of the valve of the present invention showing the valve element in the open, stowage position and showing, in phantom lines, the valve element in the closed, sealing position, with the valve body and the inner side wall of the stowage arm and central chamber having a like taper.

FIGS. 2a, 2b and 2c are partial, schematic sections showing diversified means for releasably supporting the valve head in the stowage arm.

FIG. 3a is a fragmentary sectional view of the valve showing a valve body having a uniform cross-sectional area and showing the inner wall of the stowage arm tapered inwardly in the plumb direction and merging with the central chamber inner wall of uniform cross-sectional area.

FIG. 3b is a fragmentary sectional view similar to FIG. 3a and shows the valve head in engagement with releasable catch means downwardly spaced from the support means.

FIG. 4 is a fragmentary, schematic, top plan view of the valve shown in FIG. 3a.

FIG. 5 is a front elevational view of a modified form of the valve element with an exploded sectional view of the surface to show alternating lands and grooves.

FIG. 6 is a sectional view of the valve showing the inlet and outlet conduits disposed at a right angle.

DETAILED DESCRIPTION

Referring now to the drawings and, in particular, to FIGS. 1 and 2, there is shown a shock actuated shut-off valve for fluid flow lines which includes a valve housing 2 having a central chamber 4 in communication with (a) a hollow inlet conduit 6, (b) a hollow outlet conduit 8, and (c) a hollow stowage arm 10 provided with a threaded closure 12 at its outer end. The stowage arm is in upward, substantially plumb communication with the central chamber while the inlet and outlet conduits, in this embodiment, are in horizontal linear alignment.

A valve element is disposed in the stowage arm. The valve element includes a valve head 14, a valve neck 16 and an elongated valve body 18, with the valve head being distal to the central chamber. The valve head is defined by an upper surface 20, a depending side wall 22 and a lower surface 24. The upper surface is provided with a recess 26 having a re-set loop 28 mounted therein and the lower surface is provided with a circumferential groove 30. The merging corner 32 of the upper surface and depending side wall of the valve head can form an oblique angle as shown in FIG. 2b or an arcuate configuration as shown in FIG. 2a. The side wall of the valve body 18, in this embodiment, tapers inwardly in the plumb direction.

A support member 34, for releasably maintaining the valve element in the stowage arm, is secured to the inner wall 25 of the stowage arm at a locus near the outer end thereof. The support member is inclined upwardly at a moderately steep angle with its outer end cooperatively and supportively engaging the circumferential groove 30 in the lower surface of the valve head. In an alternative embodiment, the support member 34a is inclined at a relatively shallow angle and provided with one rib 34b or two ribs 34c for supportively engaging a corresponding number of grooves in the lower surface of the valve head as shown in FIB. 2b and FIG. 2c, respectively. In a further embodiment, the outer end of the support member has a bulbous configuration, as shown in FIG. 2a. Also, the support member may be yieldably disposed with respect to the stowage arm and, in this connection, may comprise a spring-loaded member.

To facilitate directional guidance of the valve element away from the support member 34 during dislodgement, the inner surface of the threaded closure 12 is provided with an arcuate corner 36; or a closure insert 38 having an arcuate corner 38a and supported by a shoulder in the outer end of the stowage arm may be used for this purpose, as shown in FIG. 2a.

The lower portion 40 of the housing, opposite the stowage arm, is distended to provide a lower level continuation of the central chamber. A threaded aperature 42 traverses the distended portion of the housing and is sealingly engaged by a removable threaded plug 44. This aperture permits mechanical means to be inserted into the lower end of the central chamber to assist in re-setting the valve element from the sealing position to the stowage position.

The inlet conduit 6 includes contiguous outer and inner sections 46, 48 with the diameter of the outer section being larger than the diameter of the inner section. The inner section is an internally threaded section for connection to a fluid inlet pipe. The enlarged outer end of the inlet conduit permits the inlet joint to accommodate the stress arising from vibratory forces and minimizes the likelihood of pipe line failure at this joint. The outlet conduit 8 is internally threaded for connection to a fluid outlet pipe.

The inner wall 25 of the stowage arm 10 is provided with a taper which corresponds to the taper of the valve body 18. The taper angle of the inner wall is continued through the central chamber to the inner side wall 50 of the distended portion of the housing.

The valve element is disposed in the stowage arm in spaced relationship to the inner wall thereof. The dimensions for the valve element are so selected as to provide clearance for the valve element between the support member 34 and the oppositely disposed face of the inner wall 25 whereby lateral dislodgement of the valve head from the support member effects transition of the valve element through the stowage arm to the central chamber 4, with the valve body sealingly engaging the inlet and outlet conduits 6, 8 at their confluence with the central chamber and with the lower end of the valve body seating in the distended portion 40 of the housing as shown by valve element phantom lines in FIG. 1.

The valve body may advantageously be provided with a longitudinal vent 52 as shown in FIG. 3a in order to equalize the pressure at the upper and lower ends of the stowage arm and thereby facilitate transition of the valve element from the stowage position to the sealing position.

In an alternative embodiment, as shown in FIG. 3a, the valve body 54 and the central chamber 56 have a cylindrical configuration while the inner wall 58 of the stowage arm tapers inwardly in the plumb direction. A support member 60 is secured to the inner wall of the stowage arm at a moderately inclined angle. This support member is provided with an upper flat face 62 for supportively engaging the lower surface 64 of the valve head 66. A retainer 68 is secured to the inner wall of the stowage arm at a locus in upward spaced relationship to the valve head. This retainer limits upward movement of the valve element during dislodgement from the support member. A catch member 70 is secured to the inner wall of the stowage arm at a moderately inclined angle and at a locus in downward spaced relationship with respect to the support member 60. The catch member is provided with an upper flat face for releasably engaging and catching the lower surface of the valve head following displacement of the valve element from the support member as shown in FIG. 3b. The catch member is so located that the valve element, when retained by the catch member, does not impede the flow of fluid through the central chamber. The catch member is utilized to restrain full deployment of the valve element under vibratory conditions which are sufficient to displace the valve element from the support member but which do not require the closing of the fluid line. Following displacement of the valve element 54 from its position shown in FIG. 3A to its position shown in FIG. 3B, a subsequent shock effects further displacement of the valve element to the closure position as shown in phantom lines in FIG. 3A.

In a further embodiment, the inlet and outlet conduits 6, 8 are disposed at a right angle as shown in FIG. 6 and the outlet conduit includes a valve seat 73 at the confluence of the central chamber for sealingly engaging the lower end of the valve body 74.

The valve body and the inner wall of the housing defining the central chamber may advantageously be coated with a suitable plastic skin such as Teflon coating or a sealing lubricant such as graphite 72 as shown in FIG. 3b in order to enhance the operational and sealing characteristics of the valve element. Alternatively, as shown in FIG. 5, the surface of the valve may be provided with alternating lands 74 and grooves 76 for coating and packing with a sealing lubricant.

The shut-off valve of this invention is, preferably, installed in the gas line between the meter and the associated structure and, to facilitate level installation, a spirit level 78 is disposed in the closure 12 overlying the outer end of the stowage arm as can be seen in FIG. 1.

A suitable nut 80 is integrated with the threaded closure to facilitate removal of the closure from the threaded stowage arm and re-assembly of the same.

From the foregoing, it will be seen that the valve element is a generally elongated structure in the nature of a plumb bob which is suspended in a hollow stowage arm, in the normally open position, by a support member secured to the inner wall of this arm. The hollow arm merges with a downwardly positioned central chamber which is confluent with inlet and outlet fluid conduits with the central chamber defining a valve receptacle which matingly and sealingly receives the valve element upon dislodgement from the support member and thereby shuts off fluid flow through the chamber.

When the shut-off valve is subjected to a vibratory force from any direction, the valve element inertially spins, or rocks eccentrically, as a small wheel within a large wheel and a whipping action is exerted on the valve head, thereby twisting or disengaging it from its mount which may take the form of a pin, ledge, shelf or other support means. Following displacement, the valve element drops by gravitation into the central chamber. In the event that the vibratory forces are in line with the support member, the valve head overcomes the slanted inertia and gravity resistance of this member to effect transition into the central chamber.

Although the valve operates generally from forces in the horizontal plane, it can also be actuated by forces in the vertical plane if the configuration of the overhead structure, closure or insert, is such as to provide an arcuate deflecting surface above the outermost circumference of the valve head.

The valve housing may be a one-piece casting of suitable material while the valve element may be made from solid or hollow bar stock.

Re-set is manually effected by removing the closure from the stowage arm and engaging the retrieval loop in the valve head with a suitably bent wire. The valve element is then returned to its stowage position where it is supportively engaged by the support member, and the closure is re-assembled to the stowage arm. In the event that the valve element becomes tightly wedged in the closed position, the bottom plug, which also may serve as a sediment or moisture drain and inspection port, may be removed and the valve element tapped out of its wedged position with a suitable instrument.

In certain applications, there may be a need for positive latching of the valve element following actuation and seating of the same in the central chamber. This type of latching can be effected by a pin-spring detent type device mounted in a suitable location in lower part of the stowage arm such that the pin overlies the valve element when the latter is in the closed position.

The shut-off valve described herein may be used to monitor electrical machinery with respect to vibrational malfunction wherein the displacement of the valve element from the support member actuates a switch device to energize a warning system and/or open the circuit to the malfunctioning machine.

While in the foregoing description and accompanying drawing there has been shown and described the preferred embodiment of this invention, it will be understood, of course, that minor changes may be made in the details of construction as well as in the combination and arrangement of parts without departing from the spirit and scope of the invention as claimed.

That which is claimed is:

1. A shock actuated shut-off valve for fluid flow lines which comprises:

a valve housing having a central chamber in communication with (a) a hollow inlet conduit, (b) a hollow outlet conduit, and (c) a hollow stowage arm in upward, substantially plumb communication with said chamber, said stowage arm being provided with closure means at its outer end;

a valve element disposed in said stowage arm, said valve element having a valve body and a valve head interconnected by a valve neck, with the valve head being distal to the central chamber;

valve element support means secured to the inner wall of said stowage arm, with the valve head of said valve element being in engagement with and releasably supported by said support means; and said valve element being in spaced relationship to the inner wall of said stowage arm to provide valve element clearance between said support means and said wall whereby lateral dislodgement of the valve head from the support means effects transition of the valve element through the stowage arm to the central chamber with the valve body sealingly engaging said chamber with respect to at least one of said inlet and outlet conduits.

2. The shut-off valve of claim 1 wherein the lower surface of the valve head is provided with groove means and the upper surface of the support means is provided with rib means for engaging said groove means.

3. The shut-off valve of claim 1 which includes releasable catch means secured to the inner wall of the stowage arm at a locus downwardly spaced with respect to said support means for releasably catching and holding the valve head of the valve element upon dislodgement of the valve element from said support means, with said catch means maintaining said valve element substantially in said stowage arm in non-sealing engagement with respect to said central chamber.

4. The shut-off valve of claim 1 wherein one of the conduits is substantially in alignment with the stowage arm and is provided with an apertured valve seat for receiving the end of the valve body distal to the valve head.

5. The shut-off valve of claim 1 wherein the valve head includes an upper surface and a depending side wall with said surface and said side wall converging in an arcuate corner and the inner surface of the closure in abutment with the bore of the stowage arm is provided with an arcuate configuration.

6. The shut-off valve of claim 1 wherein the inlet conduit includes contiguous outer and inner sections with the diameter of the outer section being larger than the diameter of the inner section and said inner section being an internally threaded section.

7. The shut-off valve of claim 1 wherein the valve body and the inner wall defining the central chamber are provided with a coating comprising a plastic skin or sealing lubricant.

8. The shut-off valve of claim 1 wherein the valve body is provided with alternating lands and grooves with said lands and grooves and the inner wall defining the central chamber being provided with a coating comprising a sealing lubricant.

9. The shut-off valve of claim 1 wherein the valve body is provided with a longitudinally disposed vent.

10. The shut-off valve of claim 1 wherein reset means are disposed within a recess in the upper surface of the valve head.

11. The shut-off valve of claim 1 wherein the lower surface of the valve head is provided with groove means for engaging the outer end of the support means with said support means being upwardly inclined with respect to the inner surface of the stowage arm.

12. The shut-off valve of claim 11 wherein the outer end of said support means has a bulbous configuration.

13. The shut-off valve of claim 1 wherein the inlet and outlet conduits are substantially in horizontal linear alignment.

14. The shut-off valve of claim 13 wherein the lower part of the housing, opposite to said stowage arm, is distended to provide a lower level continuation of the central chamber.

15. The shut-off valve of claim 14 wherein the valve body has a substantially uniform cross-sectional area and the inner wall of said stowage arm is tapered inwardly in the plumb direction to guide said valve element into the central chamber to sealingly align with the inlet and outlet conduits at their respective locus of confluence with said central chamber.

16. The shut-off valve of claim 14 wherein the distended portion of the housing include aperture means and cooperating removable plug means sealingly disposed in said aperture means.

17. The shut-off valve of claim 15 which includes retaining means secured to the inner wall of said stowage arm at a locus upwardly spaced from said support means to limit upward displacement of said valve element.

18. The shut-off valve of claim 15 wherein the taper angle of the stowage arm inner wall is continued through the central chamber to the side wall of the distended portion of the housing and the valve body is provided with a substantially corresponding taper for sealingly engaging said central chamber.

* * * * *